(12) United States Patent
Bolshinsky et al.

(10) Patent No.: US 10,331,678 B2
(45) Date of Patent: Jun. 25, 2019

(54) SHARING CONTENT BASED ON EXTRACTED TOPICS

(71) Applicant: International Business Machines Corporation, Armonk, NY (US)

(72) Inventors: Leonid Bolshinsky, Karmiel (IL); Vladimir Gamaley, Rehovot (IL); Sharon Krisher, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 907 days.

(21) Appl. No.: 14/561,403

(22) Filed: Dec. 5, 2014

(65) Prior Publication Data

US 2016/0162485 A1 Jun. 9, 2016

(51) Int. Cl.
*G06F 16/2457* (2019.01)
*G06F 16/9535* (2019.01)

(52) U.S. Cl.
CPC .... *G06F 16/24578* (2019.01); *G06F 16/9535* (2019.01)

(58) Field of Classification Search
CPC .......... G06F 17/3053; G06F 17/30867; G06F 16/24578; G06F 16/9535
See application file for complete search history.

(56) References Cited

U.S. PATENT DOCUMENTS

| | | | |
|---|---|---|---|
| 8,473,550 B2 | 6/2013 | Nguyen et al. | |
| 8,510,380 B2 | 8/2013 | Faller et al. | |
| 8,621,019 B2 | 12/2013 | Nguyen et al. | |
| 8,707,184 B2 | 4/2014 | Chen et al. | |
| 8,762,462 B1 | 6/2014 | Duddu et al. | |
| 9,026,592 B1* | 5/2015 | Marra | H04L 29/06414 709/204 |
| 9,177,065 B1* | 11/2015 | Ben-Yair | G06F 17/30867 |
| 2006/0200434 A1* | 9/2006 | Flinn | G06N 99/005 706/12 |
| 2007/0106710 A1* | 5/2007 | Haustein | G06F 3/0605 |
| 2007/0214097 A1 | 9/2007 | Parsons et al. | |
| 2009/0234876 A1 | 9/2009 | Schigel et al. | |
| 2011/0010384 A1 | 1/2011 | Luo et al. | |

(Continued)

OTHER PUBLICATIONS

"System and Method to Share Information in Social Network Based on Mining Chat Message and Browsing History," [online] An IpP.com Prior Art Database Technical Disclosure No. 000212660, Nov. 22, 2011, retrieved from the Internet: <http://ip.com/IPCOM/000212660>, 8 pg.

(Continued)

*Primary Examiner* — Jorge A Casanova
(74) *Attorney, Agent, or Firm* — Cuenot, Forsythe & Kim, LLC

(57) ABSTRACT

Examples of techniques for sharing content based on topics are described herein. A method includes extracting a content topic from a piece of content. The method includes extracting a user topic based on a user activity. The method also includes matching the content topic with the user topic and generating a user score based on a detected number activities a user performs that include a matched user topic. The method further includes generating a sorted list of users with matched user topics, the list to be sorted by the user score.

15 Claims, 7 Drawing Sheets

400

(56) References Cited

U.S. PATENT DOCUMENTS

| | | | |
|---|---|---|---|
| 2011/0196922 A1* | 8/2011 | Marcucci | G06Q 10/10 |
| | | | 709/204 |
| 2012/0005224 A1* | 1/2012 | Ahrens | G06Q 10/10 |
| | | | 707/769 |
| 2012/0066073 A1* | 3/2012 | Dilip | G06Q 30/0269 |
| | | | 705/14.66 |
| 2012/0110474 A1 | 5/2012 | Chen et al. | |
| 2012/0324027 A1 | 12/2012 | Vaynblat et al. | |
| 2013/0006879 A1 | 1/2013 | Ramanathan et al. | |
| 2013/0110928 A1* | 5/2013 | Ghosh | G06Q 50/01 |
| | | | 709/204 |
| 2013/0117364 A1 | 5/2013 | Banta et al. | |
| 2013/0124437 A1* | 5/2013 | Pennacchiotti | G06Q 30/0255 |
| | | | 706/12 |
| 2014/0032674 A1 | 1/2014 | Nguyen et al. | |
| 2014/0156743 A1 | 6/2014 | Veda et al. | |

OTHER PUBLICATIONS

"System and Method to Automatically Identify Appropriate Social Network Recipients for a Post Based on Content and Prior User Behavior," [online] An IP.com Prior Art Database Technical Disclosure No. 000229415, Jul. 28, 2013, retrieved from the Internet: <http://ip.com/IPCOM/000229415>, 3 Pg.

Mell, P. et al., "The NIST Definition of Cloud Computing," [online] National Institute of Standards and Technology, US Dept. of Commerce Special Publication No. 800-145, Sep. 11, 2011, retrieved from the Internet: <http://csrc.nist.gov/groups/SNS/cloud-computing/index.html>, 7 pg.

\* cited by examiner

400

SHARING CONTENT BASED ON EXTRACTED TOPICS

BACKGROUND

The present techniques relate to sharing digital content. More specifically, techniques discussed herein relate to sharing digital content over a social network.

SUMMARY

According to an embodiment described herein, a system can include a processor. The processor can extract a content topic from a piece of content. The processor can also extract a user topic based on a user activity. The processor can further match the content topic with the user topic. The processor can also generate a user score based on a detected number activities a user performs that include a matched user topic. The processor can also further generate a sorted list of users with matched user topics, the list to be sorted by the user score.

According to another embodiment described herein, a method can include extracting a content topic from a piece of content. The method can also include extracting a user topic based on a user activity. The method can further include matching the content topic with the user topic. The method can also further include generating a user score based on a detected number activities a user performs that include a matched user topic. The method can also include generating a sorted list of users with matched user topics, the list to be sorted by the user score.

According to another embodiment described herein, a computer program product for content sharing can include a computer-readable storage medium having program code embodied therewith. The computer readable storage medium is not a transitory signal per se. The program code can be executable by a processor to cause the processor to extract a content topic from a piece of content. The program code can also cause the processor to extract a user topic based on a user activity. The program code can further cause the processor to match the content topic with the user topic. The program code can also further cause the processor to generate a user score based on a detected number activities a user performs that include a matched user topic. The program code can also cause the processor to generate a list of users with matched user topics, the list to be sorted by the user score. The program code can also further cause the processor to send the sorted list to a creator of the piece of content.

DETAILED DESCRIPTION

Figure 1:
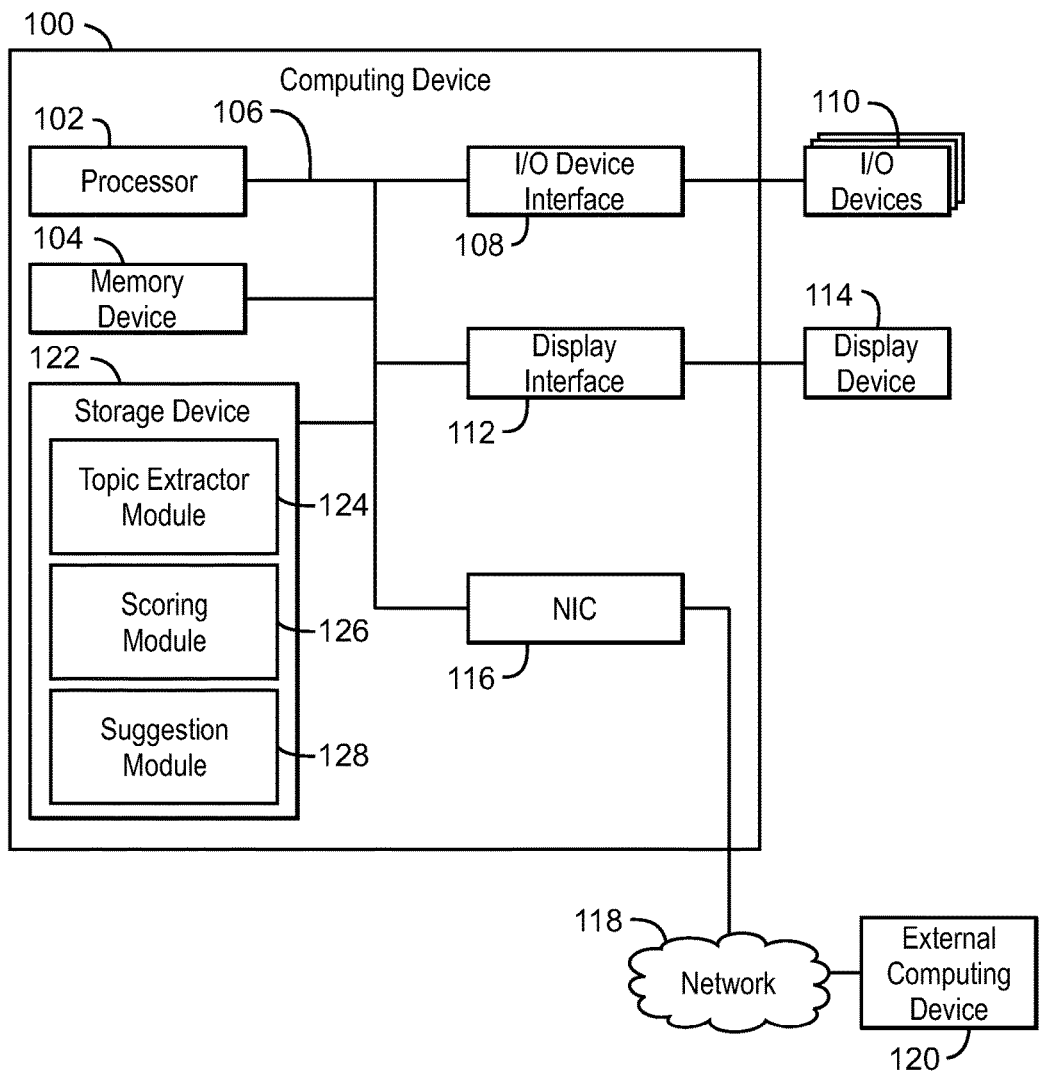
FIG. 1 is a block diagram of an example computing device that can extract topics for content sharing.

Systems such as social networks may have many people that might be interested in a variety of topics. When a user creates a piece of content a user can share that content with one or more users of a social network. However, in some cases, the user may not share the piece of content with everyone potentially interested in one or more topics of the piece of content for a variety of reasons. For example, the user may forget to include interested users or may not know that some users are interested in a topic associated with the piece of content.

According to embodiments of the present disclosure, a user score can be calculated for users of a social network for a plurality of topics based on content and user activity. A user, as used herein, refers to a person, or entity, that is part of a social network. In some examples, the user score can be based on both the amount of user activity associated with a topic as well as the user activity type. In some examples, the user score can be boosted based on social graph for the content creator. For example, where the piece of content is a user-generated content, then the users with a connection to the creator of the piece of content may receive a boost in their user scores when a list is generated for sharing. In some examples, the user topics can also be based on a query issued by the user or on tags explicitly assigned to the user by other users or by the user themselves. Thus, embodiments of the present disclosure enable interested users in a social network to be identified and ranked based on their actual day-to-day activity in addition to tags. In some examples, communities based around topics can also be listed for sharing. Additionally, the piece of content can be shared later as more people become interested in a particular topic. Therefore, the system can effectively determine other users that may be interested in a particular topic at any point in time. In some examples, the system can also be used to automatically share content after was initially shared, for example, when more users have become interested in a particular topic that the content is associated with.

In some scenarios, the techniques described herein may be implemented in a cloud computing environment. As discussed in more detail below in reference to at least FIGS. 1, 5, and 6, a computing device configured to detect a mode of operation of a given website may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 1 is block diagram of an example computing device that can extract topics for content sharing. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. An external computing device 120 may connect to the computing device 100 through the network 118. In some examples, external computing device 120 may be an external web-server 120. In some examples, external computing device 120 may be a cloud computing node.

The processor 102 may also be linked through the system interconnect 106 to a storage device 122 that can include a hard drive, an optical drive, a USB flash drive, an array of drives, or any combinations thereof. In some examples, the storage device may include a topic extractor module 124, a scoring module 126, and a suggestion module 128. The topic extractor module 124 is configured to extract a content topic from a piece of content. For example, the piece of content can be a user-generated content. In some examples, the piece of content can be a machine-generated content. For example, the machine-generated content may be created by searching previously generated content. The topic extractor module 124 may also be configured to extract a user topic based on a user activity. For example, the user activity can include viewing, editing or creating a status update, wiki entry within a predetermined time frame. In some examples, each of the content topics and user topics comprise a noun or phrase to be detected using part-of-speech analysis on the piece of content. In some examples, a user topic can further be based on a query issued by the user or on a tag explicitly assigned to the user by other users or by the user themselves.

The scoring module 126 is configured to match the content topic with the user topic and generate a user score based on a detected number of activities a user performs that include a matched user topic. In some examples, the user score can be additionally boosted based on a social graph, wherein users who are related to a content creator in the social graph are to be boosted in the sorted list of users.

The suggestion module 128 is configured to generate a sorted list of users with matched user topics, the list to be sorted by the user score. In some examples, the suggestion module 128 is configured to include communities subscribed to specific topics in the list.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the search engine 124, social graph module 126, and confidence engine 128 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the search engine 124, social graph module 126, and confidence engine 128 can be implemented with logic, wherein the logic, as referred to herein, can include any suitable hardware (e.g., a processor, among others), software (e.g., an application, among others), firmware, or any suitable combination of hardware, software, and firmware.

Figure 2:
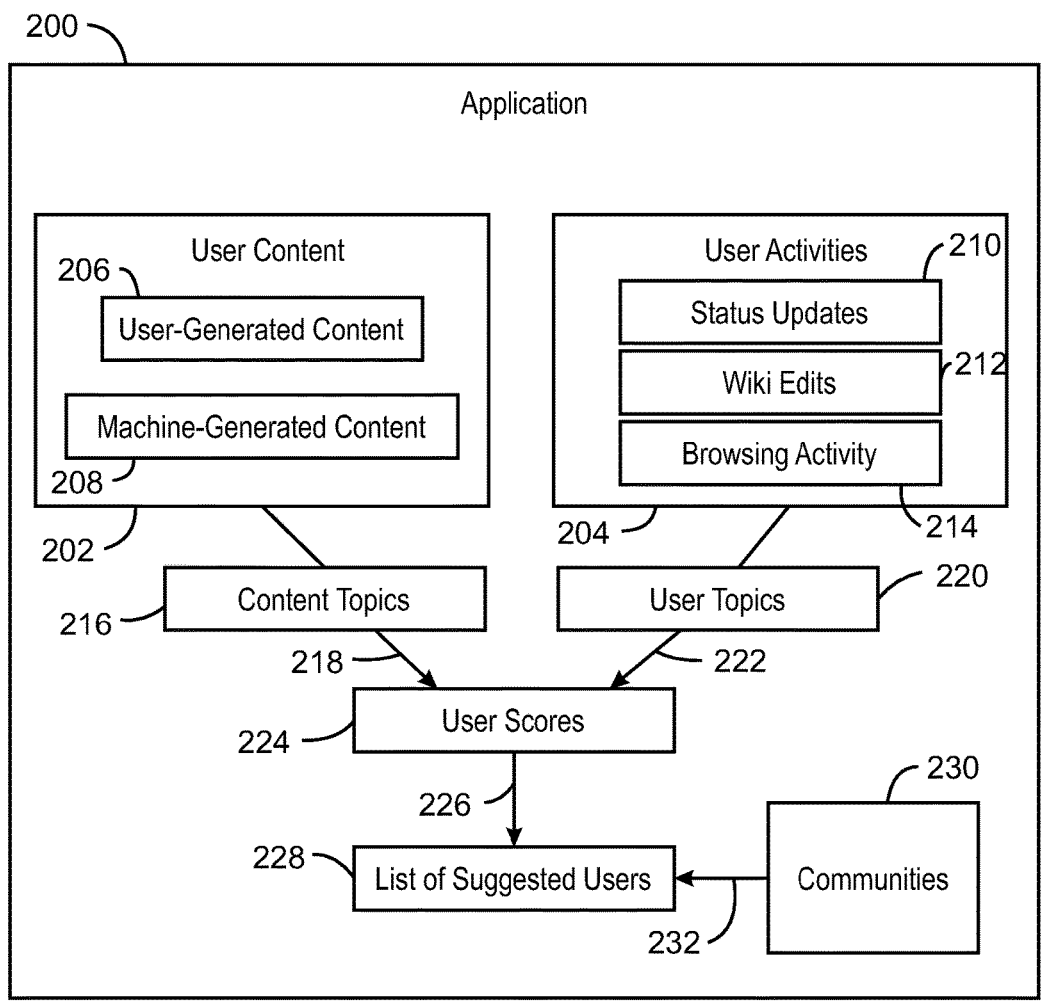
FIG. 2 is a block diagram illustrating an example application with a user score calculation.

FIG. 2 is a block diagram illustrating an example application with a user score calculation. The example application of FIG. 2 is generally referred to by the reference number 200.

In FIG. 2, the system 200 includes an application 200. For example, the application can be a social network application. The application includes user content 202 and user activities 204. The user content 202 includes user-generated content 206 and machine-generated content 208. The user activities 204 include status updates 210, wiki edits/updates 212, and browsing activity 214. Application 200 further includes content topics 216 extracted from user content 202, as indicated by arrow 218, that may be used to generate user scores 224. The application 200 also include user topics 220, which may be extracted from user activities 204 as indicated by arrow 222 and also used to generate user scores 224. The user scores 224 are to be included in a list of suggested users 228 as indicated by arrow 226. The example application 200 also includes communities 230 that can also be included in the list of suggested users as indicated by arrow 232.

As shown in FIG. 2, an example application 200 can extract 218 content topics 216 from user content 202. In some examples, user content 202 can include user-generated content 206. For example, user generated-content 206 can be content generated by a user for sharing with other users. In some examples, when a user creates a new piece of content, the piece of content can be explicitly tagged by the user with one or more tags. These tags can be used to create content topics when the piece of content is processed by the application 200. In some examples, user content 202 can also include machine-generated content 208. For example, machine-generated content can include content that comes from external information data. In some examples, part-of-speech analysis can be used to identify nouns or phrases in the text of each piece of user content. In some examples, the content topics are normalized. For example, content topics that are closely correlated can be combined into one content topic. In some examples, the content topics 216 can be periodically updated.

The example application 200 can also extract 222 user topics 220 from user activities 240. User topics 220 can be extracted from any viewing, editing or creating of a piece of content that contains topics that can be extracted. In some examples, user activities include status updates 210, wiki edits 212, and browsing activity 214, among others. For example, the status updates 210 posted by a user can indicate a user's current interests. The wiki edits 212 a user performs may further indicate a user's interests. The browsing activity 214 as captured by a social network, or other computer browser, may also indicate a user's interests. In some examples, part-of-speech analysis may be used to identify nouns or phrases in the text of each piece of a user activity. In some examples, the user topics are normalized. In some examples, the content topics 216 may be periodically updated and normalized.

Still referring to FIG. 2, the application 200 can generate a user score for each user in a social network for a particular piece of content. For example, a newly created user-generated content 206 can include topics t1, t2, through tn, where n is the number of topics in the piece of content. In some examples, the user score is the sum of (topic_i)*(score_i), where score_i is the score assigned to the relationship between topic_i and the user based on the user's activities. In some examples, the score can be boosted based on social graph scoring as discussed in more detail in reference to FIG. 3 below. Generally, users that are related to the creator of the piece of content may have their user score boosted by a predetermined amount.

The application may also generate and sort a list of suggested users 228 with whom a piece of content may be shared. In some examples, the list is sorted by the user scores 224 with or without boosting. In some examples, the sorted list of users can be sent to the content creator to select users to receive the content. For example, the content creator can select names from the sorted list of users and send the piece of content to them. In some examples, the list can include communities 230 that may be related to one or more content topics 216 in the piece of content. The content creator can also select communities to share the piece of content with and send the piece of content to those communities.

In some examples, the piece of content is machine-generated content 208. For example, some information from external information data can be added. The machine-generated content 208 can be automatically shared with the list of users. For example, a predetermined number of users or a threshold user score can be used to send machine-generated content 208 to the users. In some examples, an administrator may select or approve the machine-generated content 208 before it is actually sent out to the users and/or communities.

In some examples, the list of users can be updated periodically at predetermined intervals. For example, the list can be updated once a day, week, or month. In some examples, content created within a specific predetermined interval can be processed again. For example, new topics may be extracted and normalized from the content. The content creator can receive an updated list of suggested users and communities and select the users and communities with which to share the content. In some examples, the list can be temporary and expire after a predetermined interval. For example, a content creator may ignore the list and the list may expire after the predetermined interval.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional user activities, or additional indexes, etc.). For example, alternatively, or in addition to the diversity of evidence dimension, strength of the content associations and validity according to date can be used, among other dimensions.

Figure 3:
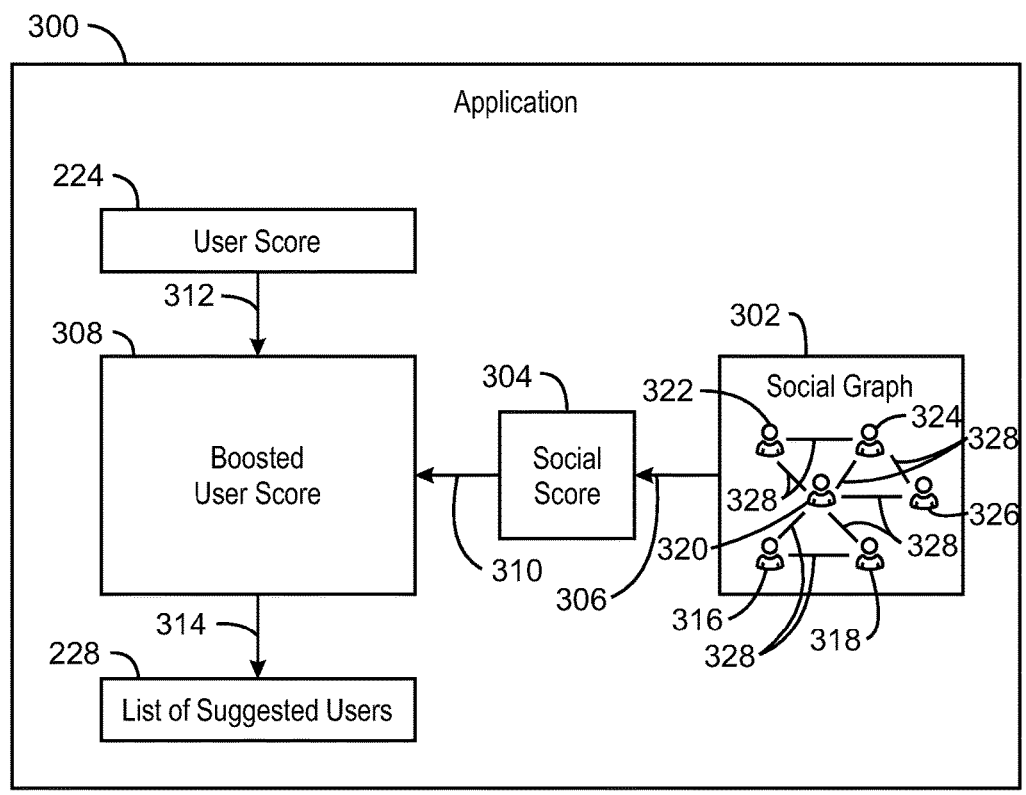
FIG. 3 is a block diagram of an example boosted user score calculation according to embodiments described herein.

FIG. 3 is a block diagram of an example application using a boosted user score calculation according to embodiments described herein. The example application 300 includes a social graph 302 that can be used to produce a social score 304 as indicated by arrow 306. The social score 304 can be used to calculate a boosted user score 308 as indicated by an arrow 310. The user score 224 can also be used to calculate the boosted user score as indicated by an arrow 312. The boosted user score 308 can be used to generate and/or sort a list of suggested users 228 as indicated by arrow 314. The social graph 302 can include a plurality of users 316, 318, 320, 322, 324, and 326. The plurality of users are connected via social connections 328.

As shown in FIG. 3, a boosted user score can be calculated for a user 316 using a social score 304 based on social graph 302. For example, user 322 can be a content creator for a new user-generated piece of content, such as the user-generated piece of content 206 of FIG. 2. In some examples, a user score 224 can be boosted based on social proximity of the user to the content creator. For example, a user directly connected to a content creator can receive more boost than a user that is once removed from a content creator. Thus, for example, user 320 may receive more of a boost being directly connected to the content creator 322, than user 316 that is once removed from content creator 322. In some examples, a social score is calculated 306 for each user connected via one or more connections 328 to content creator 322. The social score can then be used to calculate a boosted user score by increasing the user score by the social score. For example, user 316 may receive 5 social score points while user 320 may receive 10 social score points. In some examples, although a user may not display interest in a given topic, a user may still be interested in a piece of content generated by another user that the user is connected to. The boosted social score 308 enabled connected users to also be displayed in the list of suggested users 228. In some examples, the list can be sent to the content creator 322 to select users to send a piece of content to. The application 200 can receive a list of selected users and/or communities from the content creator and send the piece of content to the selected users and/or communities.

It is to be understood that the block diagram of FIG. 3 is not intended to indicate that the system 300 is to include all of the components shown in FIG. 3. Rather, the application 300 can include fewer or additional components not illustrated in FIG. 3 (e.g., additional content documents, or additional metadata, additional dimensions, etc.).

Figure 4:
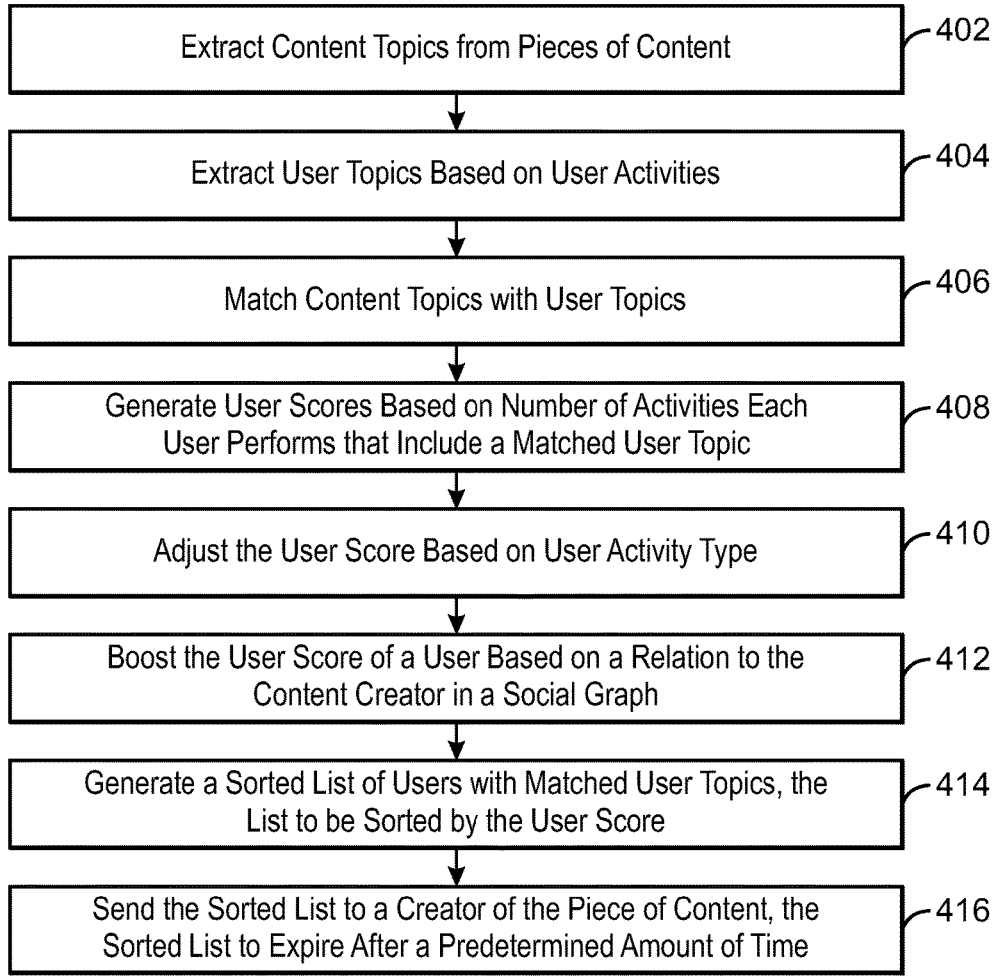
FIG. 4 is a process flow diagram of an example method that can extract topics for content sharing.

FIG. 4 is a process flow diagram of an example method that can extract topics for content sharing. The method 400 can be implemented with any suitable computing device, such as the computing device 100 of FIG. 1 and is described with reference to the example applications 200 and 300 of FIGS. 2 and 3.

At block 402, the topic extractor module 124 extracts content topics from pieces of content. For example, the content topics 216 can be extracted from user-generated content 206 or machine-generated content 208. In some examples, the user-generated content may have tags that can specify content topics. For example, the content creator or one or more other users can tag the piece of content with one or more topics. In some examples, the content topics can be normalized and updated periodically.

At block 404, the topic extractor module 124 extracts user topics based on user activities. For example, the user activities can include status updates 210, wiki edits 212, and browsing activity 214. In some examples, the user topics can be normalized and updated periodically.

At block 406, the scoring module 126 matches content topics with user topics. For example, a noun or phrase of a content topic may be matched with one or more nouns of phrases of a user topic. In some examples, the content topics and user topics are normalized such that similar nouns or phrases may also be matched.

At block 408, the scoring module 126 generates user scores based on number of activities each user has performed that includes a matched user topic. For example, the more activities performed that are related to a given matched topic the higher the user score for the user.

At block 410, the scoring module 126 adjusts the user score based on user activity type. Particular activities may demonstrate a higher amount of interest than other activities. In some examples, a status update may receive less points than a wiki edit. In some examples, the user score adjustment may be configurable.

At block 412, the scoring module 126 boosts the user score of a user based on a relation to the content creator in a social graph. In some examples, the amount of boost can be based on how remote a user is from the content creator. For example, a user directly connected with a content creator can receive more boost than a user that is once removed from a content creator.

At block 414, the suggestion module 128 generates a sorted list of users with matched user topics, the list to be sorted by the user score. In some examples, the list can also contain one or more communities. The communities can be tagged with tags that are associated with one or more content topics. For example, a list can include users ranked by user score and communities related to one or more content topics in the piece of content.

At block 416, the suggestion module 128 sends the sorted list to a creator of the piece of content, the sorted list to expire after a predetermined amount of time. For example, if the content creator does not select any users to receive content, the list may expire after a few weeks. In some examples, the content creator selects one or more users to receive content. The application can receive a list of selected users and send the piece of content to those users. In some examples, content such as machine-generated content can be sent automatically. For example, a threshold user score can be used to send users machine-generated content. In some examples, an administrator can approve or disapprove of machine-generated content prior to departure.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
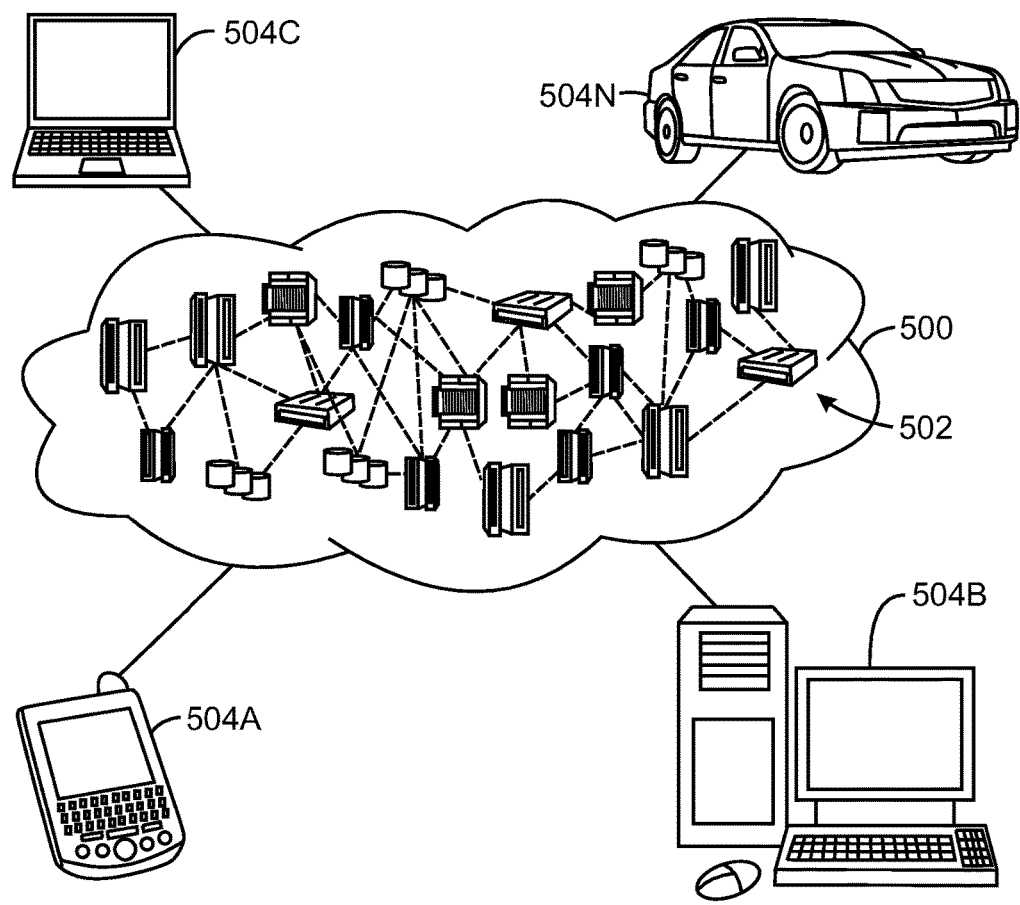
FIG. 5 is an example cloud computing environment according to embodiments described herein.

FIG. 5 is an example cloud computing environment according to embodiments described herein. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
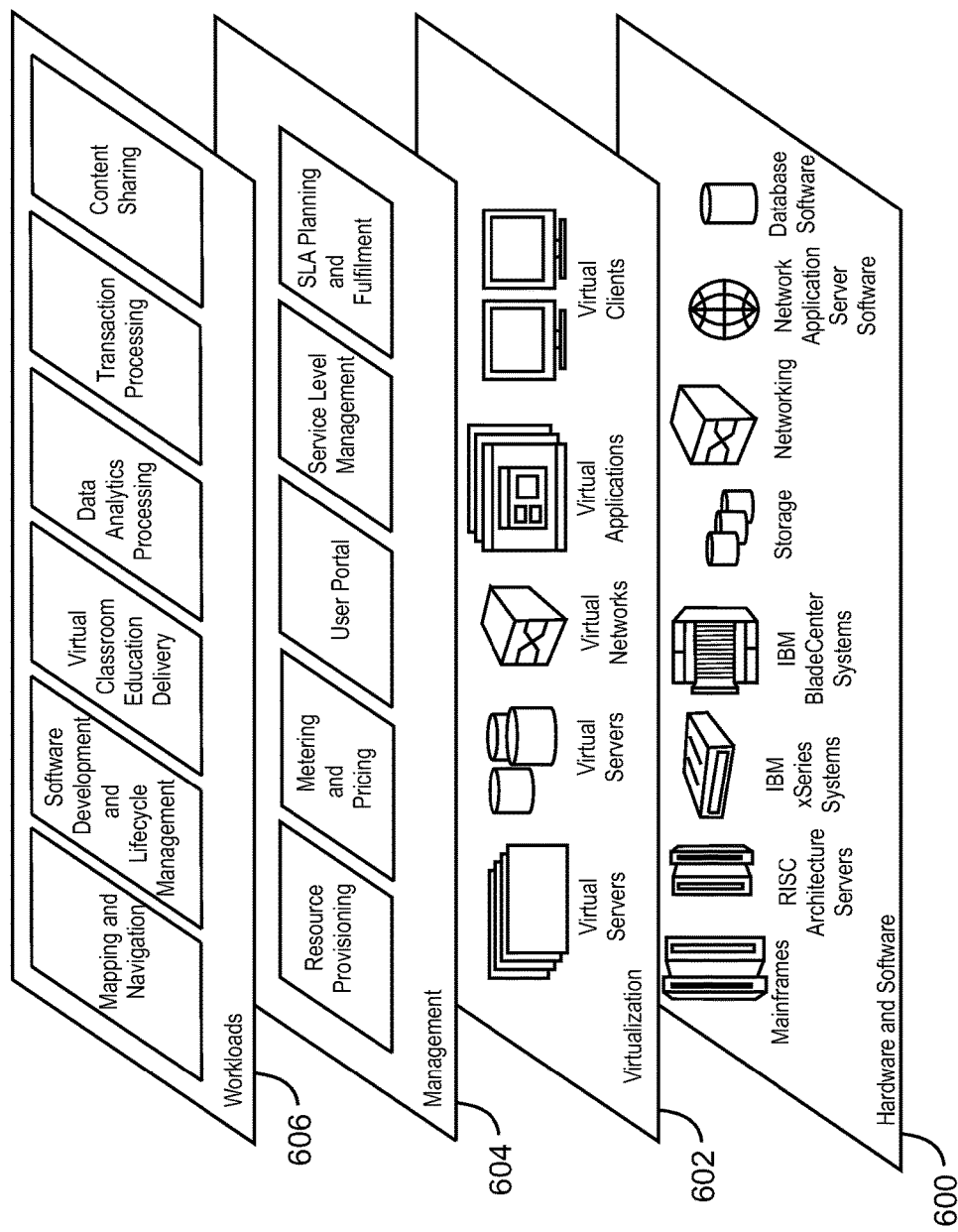
FIG. 6 depicts example abstraction model layers according to embodiments described herein.

FIG. 6 is example abstraction model layers according to embodiments described herein. In FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and content sharing.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
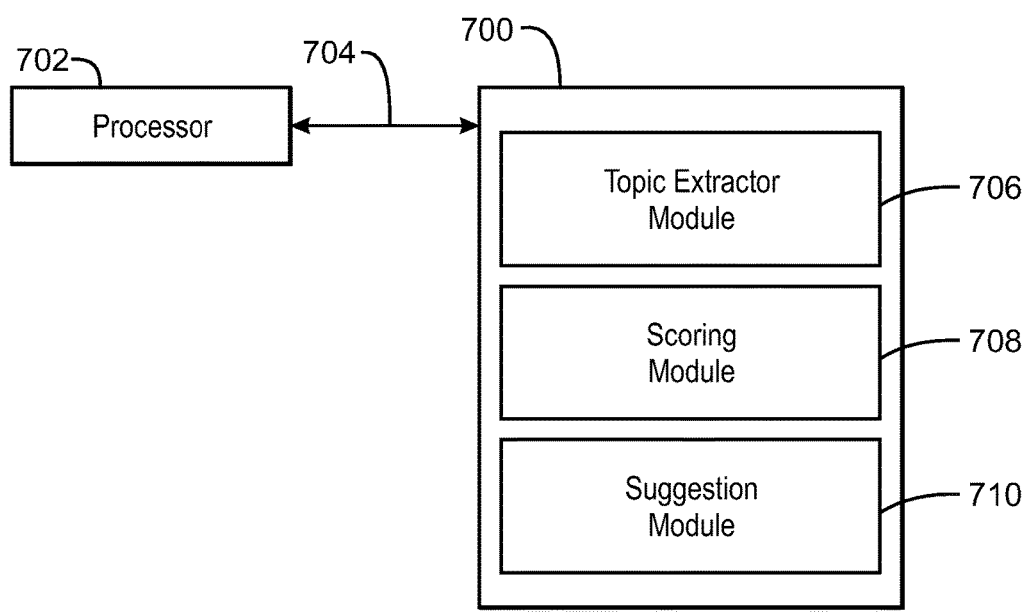
FIG. 7 is an example tangible, non-transitory computer-readable medium that can extract topics for content sharing.

FIG. 7 is an example tangible, non-transitory computer-readable medium that can extract topics for content sharing. In FIG. 7, a block diagram is depicted of an example tangible, non-transitory computer-readable medium 700 that can query expertise. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the current method.

The various software components discussed herein may be stored on the tangible, non-transitory, computer-readable medium 700, as indicated in FIG. 7. For example, a topic extractor module 706 includes code to extract a content topic from a piece of content. The topic extractor module 706 also includes code to extract a user topic based on a user activity. A scoring module 708 includes code to match the content topic with the user topic and generate a user score based on a detected number activities a user performs that include a matched user topic. A suggestion module 710 includes code to generate a list of users with matched user topics, the list to be sorted by the user score. The suggesting module 710 also includes code to send the sorted list to a creator of the piece of content.

In some examples, the suggestion module 710 can cause the processor to receive a list of selected users from the content creator and share the piece of content with the selected users. In some examples, the suggestion module 710 can cause the processor to share the content based on the user scores if the user scores meet a threshold score. In some examples, the scoring module 708 can cause the processor to adjust the user score based on user activity type. In some examples, the scoring module can cause the processor to boost the user score of a user based on a relation to the content creator in a social graph. In some examples, the suggestion module 710 can cause the processor to update the list of users after a predetermined amount of time. In some examples, the suggestion module 710 can sort the updated list based on updated user scores. In some examples, the suggestion module 710 can send the updated list of users to the content creator.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 7 may be included within the tangible, non-transitory, computer-readable medium 700, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of distributing digital content, comprising:
   extracting a plurality of content topics from a piece of digital content created by a first user;
   identifying, for each of a plurality of users in a social network including the first user, user topics based on user activities for each respective one of the plurality of users;
   generating a user score, for each of the plurality of users, based upon:
      one of the user topics matching one of the plurality of content topics,
      a type of user activity associated with the one of the user topics, and
      a number of user activities associated with the one of the user topics;
   generating a social score for a particular user of the plurality of users from a social graph that includes the first user and the plurality of users;
   modifying the user score, for each of the plurality of users, with the social score respectively associated with each user to generate a modified user score;
   sorting the plurality of users using the modified users scores for the plurality of users; and
   sending the digital content to particular ones of the plurality of users based upon the sorting, wherein the digital content is sent to the particular ones of the plurality of users based upon the particular ones of the plurality of users having user scores that exceed a threshold user score.

2. The method of claim 1, wherein
the sorting and the sending is performed automatically without user intervention.

3. The method of claim 1, wherein
the plurality of content topics and the user topics are normalized.

4. The method of claim 1, wherein
the sorting creates a sorted list, and
the sorted list expires after a predetermined amount of time.

5. The method of claim 1, wherein
the user activities include at least one of a status update, a wiki edit, and a browsing activity.

6. A computer-hardware system configured to distribute digital content, comprising:
   a hardware processor configured to initiate the following executable operations:
      extracting a plurality of content topics from a piece of digital content created by a first user;
      identifying, for each of a plurality of users in a social network including the first user, user topics based on user activities for each respective one of the plurality of users;
      generating a user score, for each of the plurality of users, based upon:
         one of the user topics matching one of the plurality of content topics,
         a type of user activity associated with the one of the user topics, and
         a number of user activities associated with the one of the user topics;
      generating a social score for a particular user of the plurality of users from a social graph that includes the first user and the plurality of users;
      modifying the user score, for each of the plurality of users, with the social score respectively associated with each user to generate a modified user score;
      sorting the plurality of users using the modified users scores for the plurality of users; and
      sending the digital content to particular ones of the plurality of users based upon the sorting, wherein the digital content is sent to the particular ones of the plurality of users based upon the particular ones of the plurality of users having user scores that exceed a threshold user score.

7. The system of claim 6, wherein
the sorting and the sending is performed automatically without user intervention.

8. The system of claim 6, wherein
the plurality of content topics and the user topics are normalized.

9. The system of claim 6, wherein
the sorting creates a sorted list, and
the sorted list expires after a predetermined amount of time.

10. The system of claim 6, wherein
the user activities include at least one of a status update, a wiki edit, and a browsing activity.

11. A computer program product, comprising:
a hardware storage device having stored therein program code, the program code, which when executed by a computer hardware system, causes the computer hardware system to perform:
   extracting a plurality of content topics from a piece of digital content created by a first user;
   identifying, for each of a plurality of users in a social network including the first user, user topics based on user activities for each respective one of the plurality of users;
   generating a user score, for each of the plurality of users, based upon:
      one of the user topics matching one of the plurality of content topics,
      a type of user activity associated with the one of the user topics, and
      a number of user activities associated with the one of the user topics;
   generating a social score for a particular user of the plurality of users from a social graph that includes the first user and the plurality of users;
   modifying the user score, for each of the plurality of users, with the social score respectively associated with each user to generate a modified user score;
   sorting the plurality of users using the modified users scores for the plurality of users; and
   sending the digital content to particular ones of the plurality of users based upon the sorting, wherein the digital content is sent to the particular ones of the plurality of users based upon the particular ones of the plurality of users having user scores that exceed a threshold user score.

12. The computer program product of claim 11, wherein the sorting and the sending is performed automatically without user intervention.

13. The computer program product of claim 11, wherein the plurality of content topics and the user topics are normalized.

14. The computer program product of claim 11, wherein the sorting creates a sorted list, and
the sorted list expires after a predetermined amount of time.

15. The computer program product of claim 11, wherein the user activities include at least one of a status update, a wiki edit, and a browsing activity.

* * * * *